United States Patent Office 3,524,000
Patented Aug. 11, 1970

3,524,000
ANTHELMINTIC COMPOSITIONS AND
METHOD OF USING SAME
John R. Egerton, Neshanic Station, and Joseph Di Netta, Watchung, N.J., assignors to Merck & Co., Inc., Rahway, N.J., a corporation of New Jersey
No Drawing. Continuation-in-part of application Ser. No. 439,926, Mar. 15, 1965. This application Oct. 20, 1967, Ser. No. 676,697
Int. Cl. A01n 9/22; A61d 7/00; A61k 27/00
U.S. Cl. 424—267
13 Claims

ABSTRACT OF THE DISCLOSURE

The anthelmintic activity of 2-substituted benzimidazoles is greatly enhanced when the benzimidazole is administered to the host animal in the presence of a tricyclic compound selected from the group consisting of dibenzocycloheptenes and thioxanthenes. Preferably, the 2-substituted benzimidazoles and the tricyclic compounds are administered together in a single formulation. Enhancement of activity, however, is also obtained when each component is administered as a separate formulation.

---

This application is a continuation-in-part of copending application, Ser. No. 439,926, filed Mar. 15, 1965, now abandoned.

This invention relates to compositions and methods useful in the treatment of parasitic diseases in animals. More particularly, the invention relates to compositions containing anthelmintically active tricyclic compounds, compositions containing both anthelmintically active 2-substitluted benzimidazoles and tricyclic compound which enhance the anthelmintic action of the 2-substituted benzimidazoles, and methods for using the tricyclic compounds either alone or together with the 2-substituted benzimidazoles. Specifically, it relates to the methods and compositions above mentioned wherein the tricyclic compounds are dibenzocycloheptenes or thioxanthenes.

Helminthiasis is a widely occurring disease affecting animals including humans and causes large economic losses in the domesticated animal industry. Particularly susceptible to the disease are ruminants such as sheep, cattle, and goats and equines such as horses and mules. A wide variety of anthelmintic agents have been discovered and have varying degrees of efficacy on the particular helminths causing the infections. Among such classes of materials is a family of 2-substituted benzimidazoles. In view of the large economic interest in the prevention and control of helminthiasis, modern-day research is directed toward providing new classes of anthelmintically active materials and finding ways for improving the efficacy of the currently known anthelmintic agents.

It is accordingly an object of the present invention to provide compositions possessing a high degree of anthelmintic activity. Another object is to provide compositions containing anthelmintically active tricyclic compounds. Another object is to provide compositions which contain effective anthelmintic and antifungal 2-substituted benzimidazoles and tricyclic compounds, in which the tricyclic compounds enhance the potency and efficacy of the 2-substituted benzimidazole. Yet a further object is to provide methods for treating helminthiasis with tricyclic compounds with the substantial absence of significant toxic effects. Still another object is to provide a method for treating helminthiasis with tricyclic compounds together with anthelmintically active 2-substituted benzimidazoles wherein the tricyclic compounds enhance the activity of the benzimidazoles. These and other objects will appear from the detailed description which follows.

According to the present invention, it has been surprisingly discovered that the anthelmintic activity of 2-substituted benzimidazoles can be greatly enhanced when the benzimidazole is administered to the host animal in the presence of certain classes of tricyclic compounds. Thus, in one of its preferred aspects, the invention provides novel 2-component compositions wherein one component is at least one of certain tricyclic compounds and the other component is at least one anthelmintically active 2-substituted benzimidazole. The 2-substituted benzimidazoles contemplated for use in the present invention have the following structural formula:

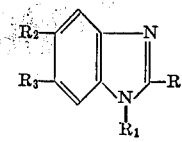

where R is thiazolyl, isothiazolyl, thiadiazolyl, pyrryl, furyl, halofuryl, thienyl, naphthyl, halonaphthyl such as 2-naphthyl-3-fluoro, pyrdyl, pyrazinyl, coumarinyl, thiacoumarinyl, phenyl, or halophenyl, $R_1$ is hydrogen, hydroxy, alkoxy, lower alkyl, alkenyl or acyl such as alkanoyl and aroyl exemplified by acetyl, propionyl, butyroyl, benzoyl and the like, $R_2$ and $R_3$ are hydrogen, lower alkyl, lower alkoxy, halogen, phenyl, halophenyl, phenoxy, thienyl or trifluoromethyl. Also contemplated for use are the nontoxic acid addition salts of the foregoing compounds.

Typical of the 2-substituted benzimidazoles which may be employed are 2-(4'-thiazolyl)-benzimidazole,
2-(2'-thiazolyl)benzimidazole,
2-(4'-thiazolyl)-5-methyl benzimidazole,
2-(2'-thiazolyl)-5,6-dimethyl benzimidazole,
2-(4'-thiazolyl)-5-trifluoromethyl benzimidazole,
2-(3'-thienyl)benzimidazole,
2-phenyl benzimidazole,
2-(2'-chlorophenyl)benzimidazole,
1-methyl-2-phenyl benzimidazole,
2-phenyl-5,6-dimethyl benzimidazole,
2-phenyl-5-ethoxy benzimidazole,
2-(2'-thienyl)benzimidazole,
1-methyl-2-(2'-thienyl)benzimidazole,
1,5-dimethyl-2-(2'-thienyl)benzimidazole,
2-(2'-thienyl)-5,6-dimethyl benzimidazole,
2-phenyl-5-ethoxy benzimidazole,
1-ethyl-2-(3'-thienyl)benzimidazole,
1-allyl-2-(2'-thienyl)benzimidazole,
2-(3'-thienyl)-5,6-dimethoxy benzimidazole,
2-(2'-furyl)benzimidazole,
2-(3'-furyl)benzimidazole, Insect species housefly ............ Oncopeltus fasciatus (Dallas)
American cockroach ___ Periplaneta americana (Linn.)
salt-marsh caterpillar ___ Musca domestica (Linn.)
spotted milkweed bug __ Estigmene acrea (Drury)

Mite Species two-spotted mite ...... Tetranychus telarius (Linn.)

TABLE I.—MORTALITY OF REPRESENTATIVE SPECIES OF COMMON INSECT ORDERS AND MITES

| Compound (Example number see supra) | M. domestica, μg. | P. americana | E. acrea | O. fasciatus | T. telarius Post embryonic | Nymphs | Eggs |
|---|---|---|---|---|---|---|---|
| | 88/10 | 50/0.1 | 50/0.1 | 10/0.1 | 95/0.01 | 100/0.1 | 50/0.1 |
| | 68/10 | 100/0.1 | 50/0.01 | 100/0.05 | 100/0.01 | 98/0.1 | 100/0.1 |
| | 50/10 | 20/0.1 | 50/0.03 | 20/0.1 | 90/0.01 | 100/0.1 | 50/0.1 |
| | 50/30 | 50/0.1 | 100/0.05 | 20/0.1 | 100/0.1 | 100/0.1 | ....... |

In the screening tests for the insect species of Table I, from ten to twenty-five insects were caged in cardboard mailing tubes 3⅛" diameter and 2⅝" tall. The cages were supplied with cellophane bottoms and screen tops. Food and water were supplied to each cake. Dispersions of the test compounds were prepared by dissolving one half gram of the toxic material in 10 ml. of acetone. This solution was then diluted with water containing 0.0175% w/v. Sponto 221, an emulsifying agent, the amount of water being sufficient to dilute the active ingredients to a concentration of 0.1% or below. The test insects were then sprayed with this dispersion. After twenty-four and seventy-two hours, counts were made to determine living and dead insects.

Some of the compounds which showed high mortality on house flies in the screening test were bioassayed on M. domestica. In this test, a known quantity of the toxicant was placed in a confined area. The same cages were employed as for the fly screening test. A weighted amount of the toxicant was placed in Pyrex petri dishes having a surface area of 18.8 sq. centimeters along with 1 ml. of acetone. After the solvent was evaporated by air-drying, a cage containing groups of twenty-five female flies, three to five days old, was placed over the residue. Counts of living and dead insects were made forty-eight hours after initiation of the test.

Compounds which had an LD$_{50}$ value (i.e., 50% of test species killed) per concentration of 50 μg. or less on house flies, were selected for contact stomach screening on the salt-marsh caterpillar. Dock leaves approximately five inches long were dipped in aqueous suspensions of the test materials for ten seconds. The leaves were then placed in one pint food containers with the stems projecting through small holes in the bottoms into vials containing water. Five 8 to 10 day-old salt-marsh larvae were introduced and the containers were closed with a petri dish top. Mortality readings were taken at twenty-four and seventy-two hours. The results are shown in Table I.

Although the above tests were accomplished with aqueous dispersions, the toxic compounds can also be used commercially in the form of aqueous solutions when appreciably soluble, non-aqueous solutions, wettable powders, vapors, and dusts as best suited to the conditions of use. In many applications, the material may even be used in its pure, undiluted form.

When used herein the term "pest" is intended in the restricted sense generally recognized in the art as supplying to the lower forms of life customarily controlled by chemical means and excluding the higher animals, the vertebrates, for example, rodents, birds, and larger forms which are more commonly controlled by mechanical means such as traps. It will be apparent to one skilled in the art that the toxic activity demonstrated hereinbefore on various test species in indicative of activity with species and orders not specifically shown.

The foregoing description is given for clearness of understanding only, and no unnecessary limitations should be understood therefrom, as modifications will be obvious to those skilled in the art.

We claim:

1. A method of controlling insect and mite pests which comprises contacting the pests with a pesticidal amount of at least one compound having the formula:

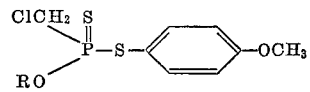

wherein R is lower alkyl.

2. A method of controlling insect and mite pests which comprises contacting the pests with a pesticidal amount of O-n-propyl - S - (p-anisyl) chloromethylphosphonodi- 3. A method of controlling insect and mite pests which comprises contacting the pests with a pesticidal amount of O-isopropyl - S-(p-anisyl) chloromethylphosphonodithioate.

4. A method of controlling insect and mite pests which comprises contacting the pests with a pesticidal amount of O-n-propyl-S-(p-anisyl) chloromethylphosphonodithioate.

5. A method of controlling insect and mite pests which comprises contacting the pests with a pesticidal amount of O-isoamyl-S-(p-anisyl) chloromethylphosphonodithioate.

References Cited

UNITED STATES PATENTS 3,248,459  4/1966  Lorenz .......... 260—951 XR
3,361,855  1/1966  Schrader ........ 260—961 XR ALBERT T. MEYERS, Primary Examiner S. J. FRIEDMAN, Assistant Examiner 3-methylsulfonyl - 5 - (3-dimethylaminopropylidene)-5H-dibenzo[a,d]cycloheptene,
5-(3-methylaminopropylidene) - 10,11 - dihydro-5H-dibenzo[a,d]cycloheptene,
also known as nortriptylene,
5-(3 - dimethylaminopropylidene)-5H-dibenzo[a,d]cycloheptene, 5-(1-methyl - 4 - piperidylidene)-5H-dibenzo[a,d]cycloheptene,
also known as cyproheptadine or Periactin,
5-(1-methyl-4-piperidylidene) - 10,11 - dihydro-5H-dibenzo[a,d]cycloheptene,
5-(3-dimethylaminopropylidene) - 10,11 - dihydro-5H-dibenzo[a,d]cycloheptene,
also known as amitriptyline,
and 5-(1-hydroxyethyl - 4 - piperidylidene)-5H-dibenzo[a,d]cycloheptene,
and salts thereof. Preferred among the foregoing are
5-(3-methylaminopropylidene) - 10,11 - dihydro-5H-dibenzo[a,d]cycloheptene,
5-(3-dimethylaminopropylidene) - 5H-dibenzo[a,d]cycloheptene,
5-(1-methyl - 4 - piperidylidene)-5H-dibenzo[a,d]cycloheptene,
5-(1-methyl - 4 - piperidylidene) - 10,11 - dihydro-5H-dibenzo[a,d]cycloheptene,
5-(3-dimethylaminopropylidene) - 10,11 - dihydro-5H-dibenzo[a,d]cycloheptene, and
5-(1-hydroxyethyl - 4 - piperidylidene)-5H-dibenzo[a,d]cycloheptene,
and most preferred are
5-(3-dimethylaminopropylidene) - 5H - dibenzo[a,d]cycloheptene,
5-(1-methyl - 4 - piperidylidene)-5H-dibenzo[a,d]cycloheptene,
5-(1-methyl - 4 - piperidylidene) - 10,11 - dihydro-5H-dibenzo[a,d]cycloheptene, and
5-(1-hydroxyethyl - 4 - piperidylidene) - 5H - dibenzo[a,d]cycloheptene,
each most preferably as the hydrochloric acid addition salt.

The thioxanthenes which may be employed are those of the classes having the following structural formulae

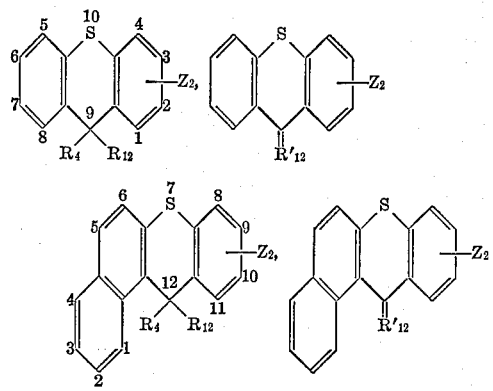

and non-toxic salts thereof, wherein $Z_2$ is hydrogen, halogen or alkyl, $R_4$ is hydrogen or hydroxy, $R_{12}$ is a substituted propyl radical of the formula

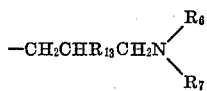

or a piperidyl radical of the formula

and $R'_{12}$ is a substituted propylidene radical of the formula

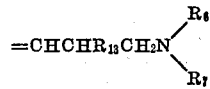

or a piperidylidene radical of the formula

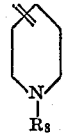

wherein $R_{13}$ is hydrogen or alkyl, wherein $R_6$ and $R_7$ are hydrogen, alkyl, or radicals in which the nitrogen atoms forms part of a heterocyclic radical with $R_6$ and $R_7$, and $R_8$ is alkyl or hydroxyalkyl, provided that when $R_4$ is hydroxy, the radical

is other than monoalkylamino. Typical of the heterocyclic radicals which the group

may form are pyrrolidino, piperazino, piperidino, morpholino, substituted or unsubstituted, and the like. The salts may be those derived from hydrohalic acids such as hydrochloric and hydrobromic acids, sulfuric acid, nitric acid, phosphoric acid, citric acid, acetic acir, propionic acid, succinic acid, tartaric acid, oxalic acid and the like. Also contemplated are the quaternary ammonium salts as previously described. Also contemplated within the above formulae are the enantiomorphic forms which may exist when $R'_{12}$ is present in the molecule. Typical of the thioxanthenes within the scope of the above formulae are:
2-chloro-9-(3-dimethylaminopropylidene)-thioxanthene,
2-chloro-9-(3-diethylaminopropylidene)-thioxanthene,
2-chloro-9-(3-dimethylaminopropyl)-thioxanthene,
2-chloro - 9 - hydroxy-9-(3-dimethylaminopropyl)-thioxanthene,
2-chloro-9-(3-pyrrolidinopropyl)-thioxanthene,
2-chloro-9-hydroxy-9-(1-methyl - 4 - piperidyl)-thioxanthene,
2-methyl - 9 - hydroxy-9-(3-dimethylaminopropyl)-thioxanthene,
2-chloro - 9 - (3-diethylaminopropylidene)-thioxanthene,
2-chloro-9-(3-morpholinopropylidene)-thioxanthene,
9-(3-dimethylaminopropylidene)-thioxanthene,
10-chloro-12-hydroxy - 12 - (3 - diethylaminopropyl)-12H-benzo[a]thioxanthene and salts thereof.
Preferred among the foregoing are
2-chloro-9-(3-dimethylaminopropylidene)-thioxanthene,
2-chloro-9-(3-dimethylaminopropyl)-thioxanthene,
2-chloro - 9 - (3 - diethylaminopropylidene)-thioxanthene, and
9-(3-dimethylaminopropylidene)-thioxanthene,
and most preferred are
2-chloro - 9 - (3 - dimethylaminopropylidene)-thioxanthene, and
2-chloro - 9 - (3 - dimethylaminopropyl)-thioxanthene,
each most preferably as the hydrochloric acid addition salt.

With regard to the individual amounts of the 2-substituted benzimidazole and the tricyclic compound present in the composition, such amounts should be sufficient to provide an effective dosage for the proper treatment of the parasitic disease considering, of course, the ability of the tricyclic compound to enhance the anthelmintic activity of the 2-substituted benzimidazole. These amounts will vary depending on the mode of treatment, the activity of the components, the size of the host, and the severity of infection. The compositions are highly effective against a phenothiazine resistant strain of *Haemonchus contortus* and the strongyle species commonly found in sheep and cattle and ordinarily result in an overall efficacy of from about 1.5–3.5 times the efficacy that would be expected from the sum of the individual activities of each component if each were used alone. In this regard, the tricyclic compound need not be present at such dosage levels as to be anthelmintically active itself, it having been discovered that the compounds will exercise their enhancing effect even when employed at levels which, if used alone, would not be anthelmintically active in the host. Generally, when single unit dosage forms such as tablets, boluses, or drenches are desired to be administered to the animal, suitable results are obtained when the compositions contain enough of the benzimidazole, in the presence of the tricyclic compound, to provide a dosage level of the benzimidazole of from 0.1–450 mg./kg. of animal body weight. Within this range, the preferred roundworm dosage level for ruminants and equines for the preferred benzimidazole compounds are as follows: 2-(4'-thiazolyl)benzimidazole and 2-(2'-thiazolyl)benzimidazole, 8–50 mg./kg.; 2-phenyl benzimidazole, 75–175 mg./kg.; the thienyl, pyrryl, and furyl benzimidazoles, 15–80 mg./kg.

The amount of tricyclic compound used in the compositions in conjunction with the foregoing dosage levels of the benzimidazoles in order to obtain the enhancing action is generally an amount sufficient to provide from about 0.05 to 3.0 times the benzimidazole dosage level. On a weight ratio basis, therefore, this range corresponds to a benzimidazole:tricyclic compound ratio in the composition of from 1:0.05–1.3. Preferably, the ratio ranges from 1:0.06–1:0.8. Stated another way, the tricyclic compounds are generally present in the compositions to the extent of from 5–300% and preferably from 6–80% based on the weight of 2-substituted benzimidazole present in the composition.

The combined amounts of each compound in the composition, as well as the remaining constituents of the composition, will vary according to the type of treatment to be employed, the host animal, and the particular parasitic disease being treated. In general, however, compositions containing a total weight percent of the benzimidazole and tricyclic compound ranging from 0.001 to 95% will be suitable, with the remainder being any suitable carrier or vehicle. Within this range, the relative amounts of benzimidazole compound to tricyclic compound is not critical except to the extent that the resulting composition is pharamaceutically effective, considering the ability of the tricyclic compound to enhance the activity of the benzimidazole. When the compositions are to be solid unit dosage forms as in tablets or boluses, the ingredients other than the benzimidazoles and tricyclic compounds may be any other acceptable vehicles convenient in the preparation of such forms, and preferably materials nutritionally suitable such as starch, lactose, talc, magnesium stearate, vegetable gums, and the like. In such forms, the combined amounts of anthelmintic ingredients conveniently ranges from about 5 to 80% by weight of the total composition.

When the unit dosage form is to be in the form of a drench, the benzimidazoles and tricyclic compounds may be mixed with agents which will aid in the subsequent suspending of the anthelmintic ingredients in water, such as bentonite, clays, water soluble starches, cellulose derivatives, gums, surface active agents, and the like to form a dry predrench composition, and this predrench composition added to water just before use. In the predrench formulation, in addition to the suspending agent, such ingredients as preservatives, antifoaming compounds, and the like may be employed. Such a dry product may contain over 95% by weight of the anthelmintic compounds, the rest being contributed by the excipients. Preferably, the solid composition contains from 30% to 95% by weight of the combined weights of the benzimidazole and tricyclic compounds. Enough water should be added to the solid product to provide the proper dosage level within a convenient amount of liquid for a single oral dose. A commonly used measure in the field is one fluid ounce of material and thus that one fluid ounce of material should contain enough of the compounds to provide the effective dosage level. Liquid drench formulations containing from about 10 to 80 weight percent of dry ingredients will in general be suitable with the preferred range being from 15 to 50 weight percent.

Where the compositions are intended to be used as feeds, feed supplements or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like are all suitable. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Feed supplement formulations containing from about 5% to about 50% by weight, and preferably from about 10–30% by weight of active ingredient are particularly suitable for addition to feeds. The active compounds are normally dispersed or mixed uniformly in the diluent but in some instances may be adsorbed on the carrier.

These supplements are added to the finished animal feed in an amount adequate to give the final concentration desired for controlling or treating helminthiasis by way of the animal ration. Although the preferred level in feeds will depend on the particular compounds being employed, the combined weights of benzimdazole and tricyclic compounds of this invention are normally fed at levels of 0.05–25% in the feed. Where the treatment is prophylactic, smaller amounts may be employed, suitably of the order of 0.001–3.0 weight percent based on the weight of feed, and may be administered over prolonged periods. An advantageous method of administering the compositions of this invention to animals whose feeds are conveniently pelleted, such as sheep, is to incorporate them directly in the pellets. For instance, the compositions of the present invention are readily incorporated in nutritionally adequate alfalfa pellets (during the pelleting operation) at levels of about 2 to 110 grams per pound of pellets for therapeutic use, and at lower elvels for prophylactic use, and such pellets fed to the worm-infected animals. Alternatively, the anthelmintic compositions may be incorporated in salt licks or salt blocks at any desired concentration (concentrations of 5–25% by weight are conveniently employed). Large animals, such as sheep and cattle, then receive the anthelmintics with their salt.

As stated previously, a preferred mode of administering the tricyclic compound with the 2-substituted benzimidazole is to formulate them together into a single composition. It is, however, an added feature of the invention that the two compounds need not be administered simultaneously in one formulation. They may be administered separately, each in its own formulation if desired, to obtain the enhancing action of the tricyclic compound on the benzimidazole, provided that the administration of each is performed within such period of time as will allow the beneficial interaction between the benzimidazole and tricyclic compound against the helminths. This period of time will vary between different species of animal and from compound to compound. However, administration of one compound within as much as six hours of the other may be performed. If this mode of operation is practiced, the period is preferably not more than one hour.

According to another aspect of the invention, the tricyclic compounds themselves have been found to be effective as anthelmintic agents. They may, therefore, be employed in any of the foregoing compositions without any 2-substituted benzimidazoles being present. Convenient dosage levels are from 5-250 mg./kg. of animal body weight and preferably from 15-150 mg./kg. of animal body weight. The remaining ingredients of the composition when the tricyclic compounds are used alone may be the same as in the formulations, i.e., tablets, boluses, drenches, predrenches, feeds, feed premixes, and feed supplements, previously discussed in connection with compositions additionally containing 2-substituted benzimidazoles. The amount of tricyclic compound in the composition may be as much as, and more if desired, the combined weight of tricyclic compound plus 2-substituted benzimidazole in the 2-component formulation.

The preferred tricyclic compounds for use in this aspect of the invention are

5 - (3-dimethylaminopropylidene)-5H-dibenzo[a,d]cycloheptene,
5 - (1-methyl-4-piperidylidene) - 5H-dibenzo[a,d]cycloheptene,
5 - (1-methyl-4-piperidylidene) - 10,11 - dihydro-5H-dibenzo[a,d]cycloheptene,
3 - chloro - 5-(3-dimethylaminopropyl)-10,11-dihydro-5H-dibenzo[a,d]cycloheptene,
5 - (3-methylaminopropylidene) - 10,11-dihydro-5H-dibenzo[a,d]cycloheptene,
5 - (1-hydroxyethyl-4-piperidylidene) - 5H-dibenzo[a,d] cycloheptene,
5 - (3-dimethylaminopropylidene) - 10,11-dihydro-5H-dibenzo[a,d]cycloheptene,
2-chloro-9-(3-piperidinopropyl)-thioxanthene,
2-chloro-9-(3-pyrrolidinopropylidene)-thioxanthene,
2 - chloro - 9 - hydroxy-9-(3-pyrrolidinopropyl)-thioxanthene,
2-chloro-9-(3-diethylaminopropylidene)-thioxanthene,
2-chloro-9-(3-dimethylaminopropyl)-thioxanthene,
2-fluoro-9-(3-diethylaminopropyl)-thioxanthene,
2-chloro-9-(3-dimethylaminopropylidene)-thioxanthene,
2-chloro-9-(3-morpholinopropylidene)-thioxanthene,
2 - methyl - 9-hydroxy-9-(3-dimethylaminopropyl)-thioxanthene,
9 - (3-dimethylaminopropylidene)-thioxanthene and 10-chloro - 12 - (3-diethylaminopropyl)-12H-benzo[a]thioxanthene.

Most preferred are

5 - (3-dimethylaminopropylidene) - 5H - dibenzo[a,d] cycloheptene,
5 - (1-methyl-4-piperidylidene) - 10,11 - dihydro-5H-dibenzo[a,d]cycloheptene,
2-chloro-9-(3-piperidinopropyl)-thioxanthene,
2-fluoro-9-(3-diethylaminopropyl)-thioxanthene,
10 - chloro - 12 - (3-diethylaminopropyl)-12H-dibenzo[a]thioxanthene, and
2-chloro-9-(3-pyrrolidinopropylidene)-thioxanthene.

The 2-substituted benzimidazoles wherein $R_1$ is hydroxy or alkoxy may be prepared by treating an o-nitroanilide of the formula

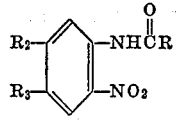

where R, $R_2$ and $R_3$ are as previously defined, with a reducing agent in a heterogeneous solvent system containing water and an organic solvent immiscible in water to reduce the nitro group to the hydroxylamino group. Solvents such as benzene, toluene, and the like may be employed. The reducing agents particularly suitable for the conversion are water soluble metal hydrosulfides, for example, ammonium hydrosulfide or sodium or potassium hydrosulfides. The reduction is preferably carried out at temperatures from about 0° C. to about 25° C. As a result of this operation, the 2-substituted benzimidazoles wherein $R_1$ is hydroxy are obtained, ring closure being effected in the reducing step. Example 7 hereinafter shows a method which may be employed generally to produce said compounds.

The 2-substituted benzimidazoles wherein $R_1$ is alkoxy are prepared from the foregoing 2-substituted benzimidazoles wherein $R_1$ is hydroxy by treating the hydroxy compound with a strong base and an alkylating agent such as a lower alkyl halide or a dilower alkyl sulfate, the alkyl group of the alkylating agent corresponding to the alkyl moiety of the alkoxy group desired at $R_1$. Suitable bases are alkali metal hydroxides such as sodium and potassium hydroxide whereas suitable alkylating agents are methyl and ethyl iodide, dimethyl sulfate, diethyl sulfate, and the like. The temperature of the reaction is preferable maintained at between 40 and 120° C. The alkoxy substituted benzimidazole may be isolated and purified by techniques well known in the art. Example 8 appearing hereinafter is considered to be representative of methods for preparing the alkoxides.

The following examples are given for the purpose of illustration only and not by way of limitation.

EXAMPLE 1

Experimental infections of a phenothiazine resistant strain of the large stomach worm, Haemonchus contortus, of sheep, are established in Haemonchus-free hosts. Thirty days following infection four groups of two sheep per group are treated with oral doses of 5-(1-methyl-4-piperidylidene)-5H-dibenzo[a,d]cycloheptene (25 mg./kg),
2-(4'-thiazolyl)benzimidazole (100 mg./kg.), and
a combination of 5-(1-methyl-4-piperidylidene)-5H-dibenzo[a,d]cycloheptene and
2-(4'-thiazolyl)benzimidazole (12.5 mg./kg. plus 50 mg./kg. and
25 mg./kg. plus 100 mg./kg.), respectively.

Two additional groups (i.e., four sheep) are retained as untreated infected controls.

The drug suspenion comprises the tricyclic compound and the benzimidazole in combination or in separate formulations in a 2% (w./v.) aqueous suspension using methyl cellulose as a suspending agent and in which the drench suspension contains sufficient drug to provide the dosage level indicated in the table.

Four days after treatment the twelve sheep are killed and the contents of the abomasa are examined microscopically for Haemonchus. The results of the experiment are recorded in Table I below.

TABLE I

| Compound | Dosage (mg./kg.) | No. H. contortus at necropsy[1] (group mean) | Percent reduction |
|---|---|---|---|
| 5-(1-methyl-4-piperidylidene)-5H-dibenzo[a,d]cycloheptene | 25 | 1,082 | 0.0 |
| 2-(4'-thiazolyl)-benzimidazole | 100 | 600 | 38.5 |
| 5-(1-methyl-4-piperidylidene)-5H-dibenzo[a,d]cycloheptene plus 2-(4'-thiazolyl)-benzimidazole | 12.5  50 | 350 | 64.1 |
| 5-(1-methyl-4-piperidylidene) 5H-dibenzo[a,d]cycloheptene plus 2-(4'-thiazoly) benzimidazole | 25  100 | 150 | 8.48 |
| Untreated infected controls | | 975 | |

[1] 34 days after infection.

EXAMPLE 2(a)

Experimental infections of a phenothiazine resistant strain of the large stomach worm *Haemonchus contortus*, of sheep, are established in Haemonchus-free hosts. Three groups of separate drench suspensions are prepared using a 2% (w./v.) methyl cellulose aqueous suspension vehicle. One group of drenches is made up of separate drenches each containing one of the tricyclic compounds listed in Table II(a) alone. Another group is comprised of individual drenches containing one of the compounds of Table II(a) together with 2-(4'-thiazolyl) benzimidazole. Drenches containing 2-(4'-thiazolyl) benzimidazole alone are also prepared. Each drench is administered as a single oral dose to separate groups of hosts at a dosage level of (unless otherwise indicated) 100 mg. of each drug per kg. of animal body weight. At the time of treatment, the infection is ten days old. Worms remaining after treatment are determined at necropsy two days after dosing. Efficacy is determined as percent reduction in number of *Haemonchus contortus* in treated animals compared to the number harbored by untreated infected control animals. The percent reduction in worms is calculated from the formula $$\frac{Hc-Ht}{Hc} \times 100 = \text{percent reduction}$$

where Hc is the average number of Haemonchus in untreated infected control animals and Ht is the average number of Haemonchus in the treated group. The efficacy of the formulations containing both the tricyclic compound and the 2-(4'-thiazolyl)benzimidazole is compared in Table II(a) to the expected efficacy expressed as the sum of the activities of each compound when administered alone.

TABLE II (a)

| Tricyclic compound | Efficacy, percent reduction ||||
|---|---|---|---|---|
| | Tricyclic alone | Benzimidazole alone | Expected efficacy° | Actual efficacy from composition |
| 5H-dibenzo[a,d] cycloheptenes: | | | | |
| 5-hydroxy-5-(1-methyl-3-pyrrolidinyl)-10,11-dihydro | <15 | <15 | <30 | 35 |
| 3-chloro-5-(3-dimethylaminopropyl)-10-11-dihydro °° | 0 | 16 | 16 | 44 |
| 5-(3-methylaminopropylidene)-10,11-dihydro °° | 0 | 16 | 16 | 49 |
| 5-(3-dimethylaminopropylident) °° | 38 | 16 | 54 | 85 |
| 5-(1-methyl-4-piperidylidene) | 19 | 15 | 34 | 96 |
| 5-(1-methyl-4-piperidylidene)-10,11-dihydro °° | 26 | 27 | 53 | 90 |
| 5-(3-dimethylaminopropylidene)-10,11-dihydro °° | 0 | 27 | 27 | 49 |
| 5-(1-hydroxyethyl-4-piperidylidene) | 11 | 27 | 38 | 75 |
| 3-methylsulfonyl-5-(3-dimethylaminopropylidene) °°° | 15 | 27 | 42 | 75 |
| Thioxanthenes: | | | | |
| 2-chloro-9-(3-dimethylaminopropylidene) °° | 19 | 27 | 46 | 93 |
| 2-chloro-9-(3-dimethylaminopropyl) °° | 0 | 16 | 16 | 92 |
| 2-chloro-9-hydroxy-9-(3-dimethylaminopropyl)- | 0 | 16 | 16 | 38 |
| 2-chloro-9-hydroxy-9-(1-methyl-4-piperidyl)- | 0 | 16 | 16 | 46 |
| 2-methyl-9-hydroxy-9-(3-dimethylaminopropyl)- | 9 | 12 | 21 | 45 |
| 2-chloro-9-(3-diethylamino-propylidene) °° | 0 | 16 | 16 | 55 |
| 9-(3-dimethylaminopropyl)-idene) °° | 0 | 18 | 18 | 58 |
| 2-chloro-9-(3-morpholino-propylidene)- | 0 | 23 | 23 | 52 |
| 2-chloro-9-(3-pyrrolidino-propyl) °° | 0 | 27 | 27 | 74 |

° The sum of percent reduction for tricyclic compound and the 2-(4'-thiazolyl)benzimidazole when administered individually.
°° As the hydrochloride salt.
°°° As the hydrogen maleate salt.

As can be seen from the foregoing table, the actual efficacy of the compositions containing both the tricyclic compound and the benzimidazole far exceed what is to be expected from the sum of individual activities.

EXAMPLE 2(b)

Experimental infections of a phenothiazine resistant strain of the large stomach worm *Haemonchus contortus*, of sheep were established in Haemonchus-free hosts. Three groups of separate drench suspensions were prepared using a 2% (w./v.) methyl cellulose aqueous suspension vehicle. One group of drenches was made up of separate drenches each containing one of the tricyclic compounds listed in Table II(b) alone. Another group was comprised of individual drenches containing the compositions listed in Table II(b). Drenches containing the various benzimidazoles alone were also prepared. Each drench was administered as a single oral dose to separate groups of hosts at the indicated dosage level. At the time of treatment, the infection was eight days old and in a stage of development generally considered to be least responsive to chemotherapy. Worms remaining after treatment were determined at necropsy two days after dosing. Efficacy was determined as percent reduction in number of *Haemonchus contortus* in treated animals compared to the number harbored by untreated infected control animals. The percent reduction in worms was calculated from the formula $$\frac{Hc-Ht}{Hc} \times 100 = \text{percent reduction}$$

where Hc is the average number of Haemonchus in untreated infected control animals and Ht is the average number of Haemonchus in the treated group. The efficacy of the formulations containing both the tricyclic compound and the benzimidazole is compared in Table II(b) to the expected efficacy expressed as the sum of the activities of each compound when administered alone at the same dosage level as is employed in the composition.

The abbreviations used hereinbelow have the following significance:

CPT—2-chloro-9-(3 - diethylaminopropylidene) - thioxanthene [chloroprothixine]

PIA—5-(1-methyl-4-piperidylidene) - 5H - dibenzo[a,d]cycloheptene [periactin]

TBZ—2-(4'-thiazolyl)benzimidazole

BZA—benzimidazole

| Benzimidazole | Tricyclic compound | Dosage, mg./kg. Benzimidazole | Dosage, mg./kg. Tricyclic compound | Efficacy, percent reduction From composition Control [1] | Efficacy, percent reduction From composition Actual |
|---|---|---|---|---|---|
|  | CPT |  | 10 |  | 6 |
|  | CPT |  | 15 |  | 0 |
|  | CPT |  | 30 |  | 0 |
|  | CPT |  | 45 |  | 25 |
|  | CPT |  | 50 |  | 34 |
|  | CPT |  | 100 |  | 45 |
|  | PIA |  | 50 |  | 0 |
| TBZ |  | 33 |  |  | 0 |
| TBZ |  | 100 |  |  | 33 |
| TBZ |  | 200 |  |  | 60 |
| 2-methyl TBZ |  | 300 |  |  | 11 |
| 5,6-difluoro TBZ |  | 15 |  |  | 0 |
| Do |  | 30 |  |  | 5 |
| Do |  | 100 |  |  | 23 |
| N-methyl TBZ |  | 300 |  |  | 17 |
| N-methoxy TBZ |  | 300 |  |  | 33 |
| 5-phenyl TBZ |  | 100 |  |  | 2 |
| 2-(2' furyl) BZA |  | 100 |  |  | 9 |
| 2-(3'-thia-1'-coumarinyl) BZA |  | 100 |  |  | 5 |
| 2-(2'-pyrazinyl) BZA |  | 100 |  |  | 4 |
| 2-(1'-pyrazolyl) BZA |  | 100 |  |  | 0 |
| 2-(2'-furyl)-5-(or 6) phenyl BZA |  | 100 |  |  | 0 |
| 2-(4'-chloro-2'-furyl) BZA |  | 100 |  |  | 0 |
| TBZ | CPT | 33 | 100 | 45 | 90 |
| N-methyl TBZ+ | CPT | 300 | 50 | 67 | 98 |
| N-methoxy TBZ | CPT | 100 | 50 | 44 | 79 |
| 2-methyl TBZ | CPT | 300 | 15 | 11 | 65 |
| Do | CPT | 300 | 30 | 11 | 89 |
| 5,6-difluoro TBZ | CPT | 100 | 50 | 75 | 94 |
| Do | CPT | 15 | 45 | 25 | 62 |
| Do | CPT | 30 | 30 | 5 | 81 |
| 2-(3'-thia-1'-coumarinyl) BZA | CPT | 100 | 50 | 40 | 55 |
| 2-(2'-pyrazinyl) BZA | CPT | 100 | 50 | 38 | 55 |
| 2-(1'-pyrazolyl) BZA | CPT | 100 | 50 | 34 | 77 |
| 2-(2'-furyl)-5(or 6) phenyl BZA | CPT | 100 | 50 | 34 | 75 |
| 2-(2'-furyl) BZA | CPT | 100 | 50 | 42 | 69 |
| 5-phenyl TBZ | CPT | 100 | 50 | 53 | 92 |
| 2-(4'-chloro-2'-furyl) BZA | CPT | 100 | 50 | 34 | 50 |
| N-methyl TBZ+ | PIA | 300 | 50 | 0 | 88 |
| Do | PIA | 300 | 50 | 0 | 71 |
| Do | PIA | 300 | 50 | 35 | 77 |
| Do | PIA | 100 | 50 | 8 | 52 |
| N-methoxy TBZ | PIA | 100 | 50 | 0 | 90 |
| 5,6-difluoro TBZ | PIA | 100 | 50 | 16 | 92 |
| 2-(3'-thia-1'-coumarinyl) BZA | PIA | 100 | 50 | 0 | 35 |
| 2-(2'-pyrazinyl) BZA | PIA | 100 | 50 | 26 | 70 |
| 2-(1'-pyrazolyl) BZA | PIA | 100 | 50 | 0 | 51 |
| 2-(2'-furyl)-5(or 6) phenyl BZA | PIA | 100 | 50 | 0 | 50 |
| 2-(2'-furyl) BZA | PIA | 100 | 50 | 8 | 84 |
| 5-phenyl TBZ | PIA | 100 | 50 | 0 | 84 |
| 2-(3'-fluoro-2'-naphthyl) BZA | PIA | 100 | 50 | 0 | 90 |
| 2-(4'-chloro-2'-furyl) BZA | PIA | 100 | 50 | 0 | 76 |

[1] The control efficacy is the sum of the efficacies of the benzimidazole and the tricyclic compound when administered separately.

The experiments summarized above show that in each of the tests set forth therein, the anthelmintic activity of compositions containing both the benzimidazole and the tricyclic compounds is greatly in excess of the sum of the efficacies of each of the individual components of said compositions when administered separately.

EXAMPLE 3(a)

Following the general procedure of Example 2(a), and again utilizing a phenothiazine resistant strain of *Haemonchus contortus*, various tricyclic compounds are tested for their anthelmintic activity at a dosage level of (unless otherwise indicated) 100 mg./kg. of animal body weight. The results are expressed below in Table III(a).

TABLE III(a)

Tricyclic compound: Percent reduction
   5H-dibenzo[a,d]cycloheptenes—
      5-hydroxy-5-(1-methyl - 3 - pyrrolidinyl)-10,11-dihydro- _____ <45
      5-(3-dimethylaminopropylidene)- _____ 38
      5-(1-methyl-4-piperidylidene)- _____ 19
      5-(1-methyl - 4 - piperidylidene)-10,11-dihydro- _____ 26
      5-(1-hydroxyethyl-4-piperidylidene)- _____ 11
      3 - methylsulfonyl-5-(3-dimethylaminopropylidene)- _____ 15
   thioxanthenes—
      2 - chloro - 9 - (3 - dimethylaminopropylidene)- _____ 19
      2 - methyl-9-hydroxy-9-(3-dimethylaminopropyl)- _____ 9
      2-chloro-9-(3-pyrrolidinopropylidene)- __ 38
      10 - chloro - 12 - (3-diethylaminopropyl)-12H-benzo[a]- _____ 59
      2-chloro-9-(3-piperidinopropyl)- _____ 58
      2-chloro - 9 - hydroxy-9-(3-pyrrolidinopropyl)- _____ 14
      2-fluoro-9-(3-diethylaminopropyl)- _____ 43

EXAMPLE 3(b)

The following compounds, when tested as the hydrochloride salt, against a normal (i.e., phenothiazine sensitive) strain of *Haemonchus contortus* at a dosage level (unless otherwise indicated) 50 mg./kg. of animal body weight have the following percent reduction (calculated as in Example 2(a)).

TABLE III(b)

| Compound: | Percent reduction |
|---|---|
| 3-chloro - 5 - (3-dimethylaminopropyl)-10,11-dihydro-5H-dibenzo[a,d]cycloheptene | 86 |
| 5-(3-methylaminopropylidene) - 10,11 - dihydro-5H-dibenzo[a,d]cycloheptene | 86 |
| 5 - (3-dimethylaminopropylidene)-10,11-dihydro-5H-dibenzo[a,d]cycloheptene | 76 |
| 5-hydroxy - 5 - (3-dimethylaminopropyl)-5H-dibenzo[a,d]cycloheptene | 86 |
| 5-(3-methylaminopropyl) - 5H - dibenzo[a,d]cycloheptene | 64 |
| 5 - (3 - methylaminopropylidene) - 5H - dibenzo[a,d]cycloheptene | 88 |
| 2-chloro - 9 - (3-dimethylaminopropyl)-thioxanthene | 93 |
| 9-(3-dimethylaminopropylidene)-thioxanthene | 84 |
| 2-methyl-9-hydroxy - 9 - (3 - dimethylaminopropyl)-thioxanthene | 74 |
| 2-chloro - 9 - (3-diethylaminopropylidene)-thioxanthene (200 mg./kg.) | 97 |

The following examples show the preparation of typical formulations containing the benzimidazole and tricyclic compound for administration to animals.

EXAMPLE 4

A drench is prepared by suspending the following ingredients in one quart of water. The ingredients may be blended into a dry mix first and the entire mix added to the water or they may be individually added to the water.

| | G. |
|---|---|
| 2-(4'-thiazolyl)benzimidazole | 25.0 |
| 5 - ( - methyl - 4 - piperidylidene) - 5H - dibenzo[a,d]cycloheptene | 25.0 |
| 5-(1-methyl-4-piperidylidene)-5H-dibenzo[a,d]cycloheptene | 25.0 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane; available from Dow-Corning) | 0.06 |
| Pregelatinized starch | 40.7 |
| | 91.02 |

The total volume of the drench obtained after one quart of water is added is about 33 fluid ounces, each fluid ounce containing about 0.759 g. of 2-(4'-thiazolyl) benzimidazole and about 0.759 g. of 5-(1-methyl-4-piperidylidene)-5H-dibenzo[a,d]cycloheptene.

EXAMPLE 5

A bolus containing 2-phenyl benzimidazole and 5-(3-dimethylaminopropylidene) - 5H - dibenzo[a,d]cycloheptene suitable for oral administration to domesticated animals of about 50 pound of body weight is prepared from the following ingredients:

| | G. |
|---|---|
| 2-phenyl benzimidazole | 3.3 |
| 5-(3-dimethylaminopropylidene)-5H-dibenzo[a,d]cycloheptene | 1.5 |
| Dicalcium phosphate | 3.0 |
| Starch | 0.535 |
| Guar gum | 0.15 |
| Talc | 0.14 |
| Magnesium stearate | 0.04 |
| | 8.665 |

The dicalcium phosphate is thoroughly mixed with the 2-phenyl benzimidazole and the dibenzocycloheptene and the mixture reduced to a particle size finer than 60 mesh. To the mixture is added 0.330 g. of starch in the form of an aqueous starch paste and the resulting mixture granulated in the usual manner. The granules are then passed through a No. 10 mesh screen and dried at 110°–130° F. for about 18 hours, and the dried material then passed through a No. 16 mesh screen. The guar gum and the balance of the starch are added and the mixture thoroughly blended. The remainder of the ingredients are then added and the whole thoroughly mixed and compressed.

EXAMPLE 6

A tablet having the following composition:

2-(4'-thiazolyl)benzimidazole—1.14 g.
2-chloro-9-(3-dimethylaminopropylidene)-thioxanthene—500 mg.
Dicalcium phosphate—150 mg.
Starch—125 mg.
Guar gum (60 mesh)—17 mg.
Talc (60 mesh)—14 mg.
Magnesium stearate (60 mesh)—5 mg.
Total—1.951 gm.

is prepared in the following manner.

The dicalcium phosphate, 2-(4'-thiazolyl) benzimidazole, thioxanthene compound, and 50 mg. of starch are thoroughly mixed and the mixture reduced to a particle size finer than 60 mesh. 45 mg. of starch in the form of an aqueous starch paste is added to the mixture and the whole granulated in the usual manner. The granules are then passed through a No. 10 mesh screen and dried at 110°–130° F. for about eight hours. The dried material is then passed through a No. 16 mesh screen. The guar gum and the balance of the starch are added and the mixture thoroughly blended. The remainder of the ingredients are then added and the mass mixed and compressed.

EXAMPLE 7

2-(4'-thiazolyl)benzimidazole-1-oxide

To a solution of 24.92 gm. of N-(o-nitrophenyl)-thiazole-4-carboxamide in 350 ml. methylene chloride is added 27.6 gm. of sodium hydrosulfide dihydrate in 200 ml. of water over 2 hours at 5° C. Calcium chloride (10.0 gm.) in 20 ml. of water is then added and the mixture is stirred vigorously at 5° C. for 6 hours and at room temperature for 18 hours. After addition of 10 gm. of ammonium chloride and one hours of stirring, the solid is filtered and washed with water. It is then dissolved in 200 ml. water by addition of 10% hydrochloric acid until pH 1.2 is achieved. Insoluble impurities are filtered off and the pH of the clear filtrate is adjusted to pH 7 by addition of 6 N ammonium hydroxide. The precipitate is filtered, washed with water and dried in vacuo. Substantially pure 2-(4'-thiazolyl)benzimidazole-1-oxide is obtained by recrystallization of the crude material from ethanol; M.P. 237–238° C.

EXAMPLE 8

1-methoxy-2-(4'-thiazolyl)benzimidazole

2 - (4' - thiazolyl)benzimidazole - 1 - oxide (0.651 g.) is added to a solution of 0.12 g. of sodium hydroxide in 6 ml. of methanol. To the clear solution is added 0.465 g. of methyliodide and the mixture is heated at 55° to 60° C. for five hours. The solvent is removed in vacuo. The oily residue is diluted with 5 ml. of water and solidifies on standing. 1-methoxy-2-(4'-thiazolyl)benzimidazole is separated by filtration, washed with water and recrystallized from (1:1) methanol-water; M.P. 117–118° C.

Any departure from the above description which conforms to the present invention is intended to be included within the scope of the claims.

What is claimed is:
1. The method for treating helminthiasis which comprises orally administering to an animal suffering from helminthiasis is an anthelmintic effective amount of a compound selected from the group consisting of dibenzocycloheptenes of the formulae

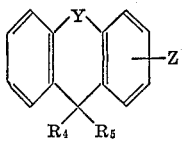 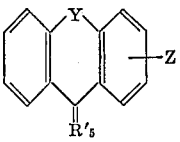

and nontoxic acid addition salts thereof, wherein Y is selected from the group consisting of —$CH_2$—$CH_2$— and —CH=CH—; Z is selected from the group consisting of hydrogen, halogen and loweralkylsulfonyl wherein the alkyl is of 1 to 4 carbons; $R_4$ is selected from the group consisting of hydrogen and hydroxy; $R_5$ is selected from the group consisting of substituted propyl radicals of the formula

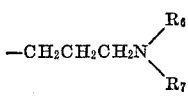

pyrrolidinyl radicals of the formula

and piperidyl radicals of the formula

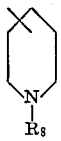

and $R_5'$ is selected from the group consisting of substituted propylidene radicals of the formula

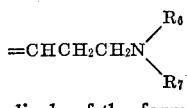

pyrrolidinylidene radicals of the formula

and piperidylidene radicals of the formula

wherein $R_6$ and $R_7$ are selected from the group consisting of hydrogen, methyl, and other alkyl groups such that when taken with the nitrogen atom to which they are attached are a heterocyclic radical selected from the group consisting of piperidino, pyrrolidino, piperazino and morpholino; and $R_8$ is selected from the group consisting of methyl and hydroxyethyl, provided that when $R_4$ is hydroxy the group

is other than monoloweralkylamino.

2. The method for treating helminthiasis which comprises orally administering to an animal 50 mg./kg. of 2-(4'-thiazolyl) benzimidazole and 12.5 mg./kg. of 5-(1-methyl-4-piperidylidene)-5H-dibenzo [a,d] cycloheptene, said administering taking place within such period of time as will allow a beneficial interaction of said benzimidazole and said dibenzocycloheptene upon said animal.

3. The method for treating helminthiasis which comprises orally administering to an animal 100 mg./kg. of animal body weight of 2-(4'-thiazolyl)benzimidazole, and from 25 to 100 mg./kg. of animal body weight of 5 - (1 - methyl-4-piperidylidene)-5H-dibenzo[a,d]cycloheptene, said administering taking place within such period of time as will allow a beneficial interaction of said benzimidazole and said dibenzocycloheptene upon said animal.

4. The method of claim 3 wherein there is administered 100 mg./kg. of 2-(4'-thiazolyl)benzimidazole and 25 mg./kg. of 5 - (1 - methyl - 4-piperidylidene)-5H-dibenzo [a,d]cycloheptene.

5. The method of claim 3 wherein there is administered 100 mg./kg. of 2-(4'-thiazolyl)benzimidazole and 100 mg./kg. of 5 - (1 - methyl - 4-piperidylidene)-5H-dibenzo [a,d]cycloheptene.

6. An anthelmintic composition comprising 50 mg. of 2-(4'-thiazolyl)benzimidazole and 12.5 mg. of 5-(1-methyl-4-piperidylidene)-5H-dibenzo[a,d]cycloheptene.

7. An anthelmintic composition comprising 100 mg. of 2-(4'-thiazolyl)benzimidazole, and from 25 to 100 mg. of 5 - (1 - methyl-4-piperidylidene)-5H-dibenzo[a,d] cycloheptene.

8. The composition of claim 7 comprising 100 mg. of 2-(4'-thiazolyl)benzimidazole and 25 mg. of 5-(1-methyl-4-piperidylidene)-5H-dibenzo[a,d]cycloheptene.

9. The composition of claim 7 comprising 100 mg. of 2-(4'-thiazolyl)benzimidazole and 100 mg. of 5-(1-methyl-4-piperidylidene)-5H-dibenzo[a,d]cycloheptene.

10. An anthelmintic composition comprising from 100 to 300 mg. of N-methyl-2-(4'-thiazolyl)benzimidazole and 50 mg. of 5-(1-methyl-4-piperidylidene)-5H-dibenzo [a,d]cycloheptene.

11. An anthelmintic composition comprising 100 mg. of 2-(4'-thiazolyl)benzimidazole and 100 mg. of 5-(3-dimethylaminopropylidene) - 5H - dibenzo[a,d]cycloheptene as the hydrochloride salt.

12. An anthelmintic composition comprising 100 mg. of 2-(4'-thiazolyl)benzimidazole and 100 mg. of 5-(1-methyl - 4 - piperidylidene) - 10,11-dihydro-5H-dibenzo [a,d]cycloheptene as the hydrochloride salt.

13. An anthelmintic composition comprising 100 mg. of 2-(4'-thiazolyl)benzimidazole and 100 mg. of 5-(3-dimethylaminopropylidene) - 10,11 - dihydro - 5H-dibenzo [a,d]cycloheptene as the hydrochloride salt.

References Cited

UNITED STATES PATENTS

| | | | |
|---|---|---|---|
| 2,985,660 | 5/1961 | Judd | 260—293 |
| 3,014,911 | 12/1961 | Engelhardt | 260—293 |
| 3,162,574 | 12/1964 | Forsyth | 167—53 |

OTHER REFERENCES

Chemical Abstracts, vol. 59 (1963), 3240e, 5101e–5102f and 11512b.

ALBERT T. MEYERS, Primary Examiner

F. E. WADDELL, Assistant Examiner

U.S. Cl. X.R.

424—270, 273, 274, 325